United States Patent [19]

Rudak

[11] Patent Number: 5,014,328

[45] Date of Patent: May 7, 1991

[54] AUTOMATIC DETECTION AND SELECTION OF A DROP-OUT COLOR USED IN CONJUNCTION WITH OPTICAL CHARACTER RECOGNITION OF PREPRINTED FORMS

[75] Inventor: Peter Rudak, Hilton, N.Y.

[73] Assignee: Eastman Kodak Company, Rochester, N.Y.

[21] Appl. No.: 557,293

[22] Filed: Jul. 24, 1990

[51] Int. Cl.$^5$ .......................... G06K 9/00; H04N 1/46
[52] U.S. Cl. ........................................ 382/17; 358/78
[58] Field of Search ...................... 382/17, 61; 358/75, 358/78, 80; 250/226

[56] References Cited

U.S. PATENT DOCUMENTS

| Re. 29,104 | 1/1977 | Shepard | 382/61 |
| 4,368,482 | 1/1983 | Machida et al. | 358/29 |
| 4,454,532 | 6/1984 | Itani et al. | 358/29 |
| 4,647,961 | 3/1987 | Kammoto et al. | 358/163 |
| 4,656,665 | 4/1987 | Pennebaker | 358/163 |
| 4,873,570 | 10/1989 | Suzuki et al. | 358/80 |

*Primary Examiner*—Leo H. Boudreau
*Attorney, Agent, or Firm*—Dennis R. Arndt

[57] ABSTRACT

A method and apparatus for separating text information from previously printed material on forms by automatically detecting and selecting the drop-out color used on a preprinted form to enhance optical character recognition of information on such forms. Using a 3-color electronic scanner, the system adjusts the filtering parameters automatically based on the form being processed.

7 Claims, 6 Drawing Sheets

AUTOMATIC DETECTION AND SELECTION OF A DROP-OUT COLOR USED IN CONJUNCTION WITH OPTICAL CHARACTER RECOGNITION OF PREPRINTED FORMS

TECHNICAL FIELD OF THE INVENTION

The invention relates to the automatic selection and detection of a drop-out color using a color electronic scanner and more particularly, allows the Optical Character Recognition (OCR) system to adjust the filtering parameters automatically based on the form itself, rather than matching the form to the optical filter.

CROSS REFERENCE TO RELATED APPLICATIONS

Reference is made to commonly-assigned, copending U.S. Pat. Application Ser. No. 557,291, entitled AUTOMATIC DETECTION AND SELECTION OF A DROP-OUT COLOR USING ZONE CALIBRATION IN CONJUNCTION WITH OPTICAL CHARACTER RECOGNITION OF PREPRINTED FORMS, and U.S. Pat. Application Ser. No. 557,294, entitled METHOD AND APPARATUS FOR AUTOMATIC TEXT SEPARATION USING AUTOMATIC ELECTRONIC FILTERING OF MULTIPLE DROP-OUT COLORS FOR OPTICAL CHARACTER RECOGNITION OF PREPRINTED FORMS, in the name of Peter Rudak and filed concurrently herewith.

BACKGROUND OF THE INVENTION

Optical Character Recognition (OCR) is a useful technique for processing business forms. Machine reading systems can replace several data-entry operators and reduce the expense of data capture.

In general, the first step of the OCR process is electronic scanning of the document and converting all of the information to a digital bit-map. Once the image is captured in an electronic format, the information to be read is separated from the background information—boxes and guide text must be ignored and the filled-out text should be read. Once this separation is accomplished, the electronic image of the text is processed by the OCR algorithm, where the characters of interest are converted to ASCII data.

Almost all OCR systems processing business forms employ the technique of a "drop-out color". By printing documents in a predetermined color (usually a pastel color) and employing an optical filter of the same color in the electronic scanner, the filled-out text on the document can be separated from the printed form. The color filter causes the scanner to ignore information printed in that color (to the electronic scanner, the form color appears as being equivalent to the white background of the paper). However, since the filled-out text typically is typed or printed in black (or other dark color), this information is captured by the scanner as black. Hence, the pre-printed form is converted to a white background and the filled-out text can be processed readily by an OCR algorithm.

Use of the optical filter works well in this application, but it limits the customer to using a very specific color on the form (one that precisely matches the characteristics of the optical filter installed in the scanner). Additional drop-out colors can be included in the scanner by adding additional optical filters. Accordingly, the processing of a particular form would require selecting the proper optical filter and mechanically inserting it prior to processing the form.

However, slight variations in the printing process or changing form vendors can produce variability in the actual color of the printed form, thereby reducing the "drop-out" effect. Such changes can cause noise to be added (the scanner sees the pre-printed form information as black instead of white) which may result in the OCR algorithm producing erroneous results. Alternatively, the changing of optical filters to accommodate these slight variations in printing is not practical, since this would require a large inventory of filters, each with slightly different characteristics. Therefore, at present, the only way to control this problem practically is to tightly control the printing process to insure a uniform drop-out color. As a result, OCR Form Reading systems presently in use are generally "closed loop", which means the Forms Processing Firm (such as an insurance carrier) must maintain control over the printing of the forms, because forms created by outside establishments may not read properly due to color variations.

The present invention eliminates the need for mechanical filter insertion and the drop-out color problem can be eliminated by use of programmable filters in the electronic scanner. Use of the present invention would allow the scanner to intelligently select the correct drop-out color based on the actual form being processed.

DISCLOSURE OF THE INVENTION

In the present invention, a programmable drop-out color is generated using a color electronic scanner. The scanner separates all images into the three primary colors: red, green, and blue. In addition, a black and white rendition of the image is produced by adding the three color components. A color filter can be "inserted" by multiplying the red, green, and blue signals by varying coefficients prior to summing. This has the tendency of biasing the output toward a certain color, hence producing the drop-out color.

Once a three channel color image of the form in process has been produced, it is then converted to three digital signals by three Analog to Digital (A/D) converters for easier processing. The three digital channels are multiplied by appropriate coefficients and summed together to form an equivalent black and white rendition. By manipulating the three coefficients, any desired drop-out color can be programmed such that the system will not respond to it. Also, because the color information is manipulated electronically rather than optically as in the past, a single scanner can be used to capture an entire color image (or equivalent black/white image) as well as "drop-out" a certain color for OCR reading. The two different outputs can be transmitted simultaneously by using different filter coefficients and/or image processing parameters for the image capture output versus the OCR output.

MODES OF CARRYING OUT THE INVENTION

Figure 1:
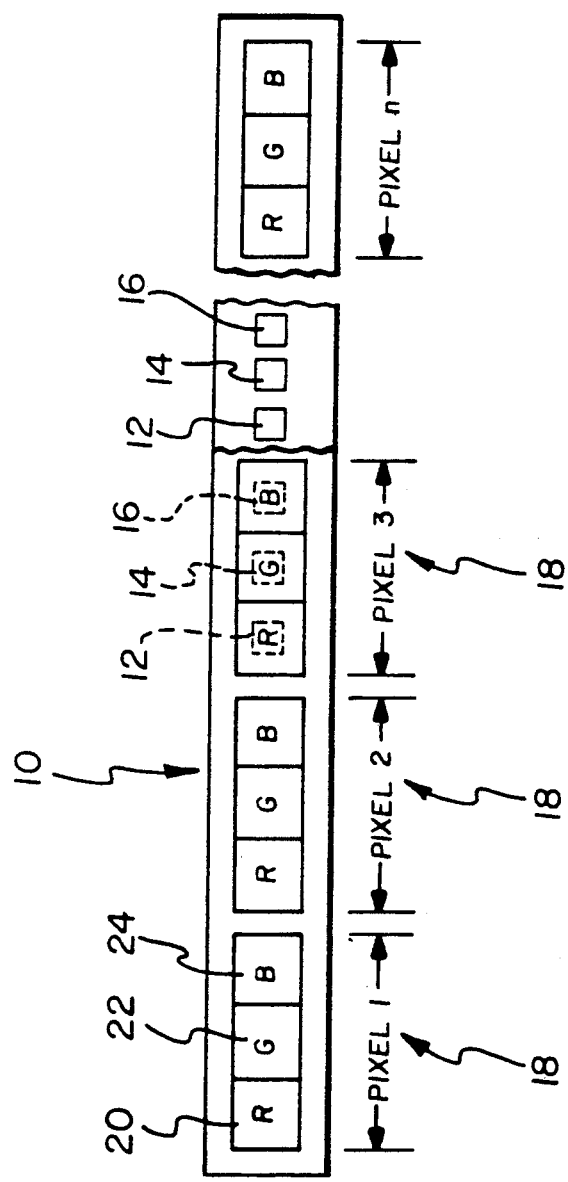
FIG. 1 illustrates the configurations of a solid state charged coupled device that can be used for color scanning.

FIG. 1 illustrates the type of electronic scanner used to generate a programmable drop-out color. This scanner would separate all images into the three primary colors: red, green, and blue. A black and white rendition of the image (as a typical electronic scanner would produce today) can be produced simply by adding the three color components. However, a color filter can be effectively "inserted" by multiplying the red, green and blue signals by varying coefficients prior to summing. This would have the tendency of biasing the output toward a certain color, hence producing the drop-out color.

The electronic scanner intended for use in the present apparatus is based on a "contact type" CCD (Charge Coupled Device) 10 currently available as Model TCD126C, made by Toshiba. The CCD is actually several CCD arrays on a single substrate and has a horizontal resolution of 1200 Pixels/inch and spans 12 inches. Because most OCR algorithms can read accurately with scan resolutions of 200 to 400 Pixels/inch, the added resolution can be used for color detection. Such detection is accomplished by masking adjacent pixels with appropriate red, green and blue optical filters with the spectral content of these filters being based on the spectral characteristics of the CCD device itself. As shown in FIG. 1, three adjacent cells 12, 14, and 16 form a single "super-pixel" 18, with cells 12, 14, and 16 being masked by red, green and blue optical filters 20, 22, and 24 respectively. If each pixel corresponds to 1/1200 the effective resolution of the CCD device would be 400 Pixels/inch. The output of this scanner contains a three channel output of red 26, green 28, and blue 30 video signals, as shown in FIG. 2.

Figure 2:
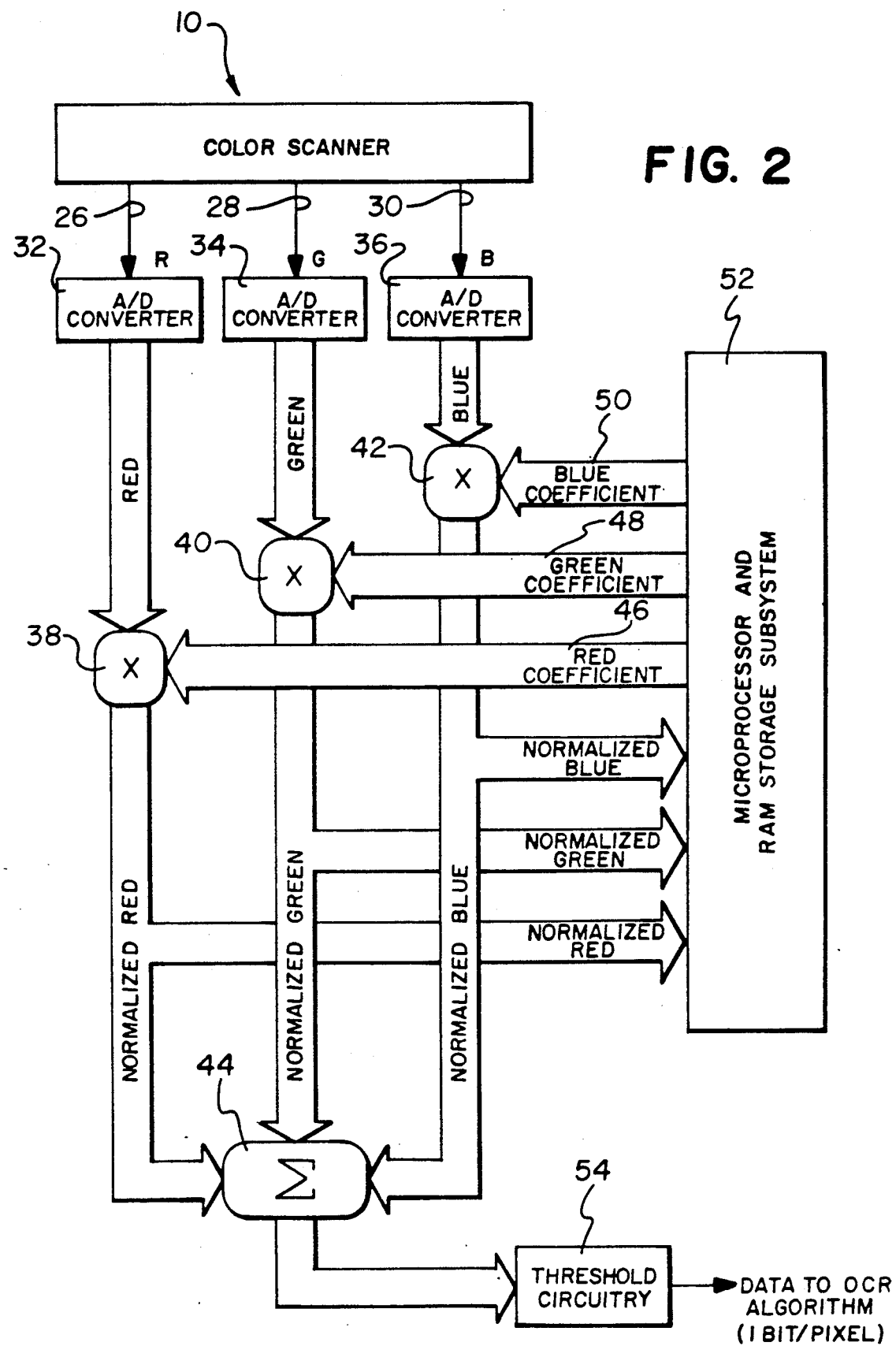
FIG. 2 illustrates a block diagram of the circuit used for electronic color filtering in accordance with the invention.

Once the three channel image of the form being processed has been produced, it is then converted to the digital domain by three Analog to Digital (A/D) converters 32, 34, and 36 for each of the channels, respectively (FIG. 2). Each of the three digital channels are then multiplied by an appropriate coefficient by multipliers 38, 40, and 42, respectively The three channels are then summed together by summer 44 to form an equivalent black and white rendition of the image. Through manipulation or adjustment of the values for the three coefficients 46, 48, and 50 used to multiply the respective channels any drop-out color can be programmed into the system.

Because the color information is manipulated electronically rather than optically, a common scanner may be used to capture an entire color image (or equivalent black/white image) as well as "drop-out" a certain color for OCR reading.

Separation of text from a drop-out color background requires a form calibration step to be performed which uses a blank form (not filled-out) just prior to actual form processing and that all subsequent forms use the same drop-out color. The calibration process must separate pre-printed material (printed usually in a pastel color which becomes the drop-out color) from the white background. The filter coefficients are based on an average value for all of the pre-printed material on the form. Use of this electronically generated and calibrated filter has the advantage of accurately matching the color used on the form. Accordingly, all forms following a form calibration must use as a drop-out color the same color used on the form during calibration; any color variations in printing with respect to the form used during calibration must be minimal. This method is well suited for application where only one type (color) of form is processed at any given time such as in "batch processing".

FIG. 2 shows a block diagram of a system implementing an electronic drop-out filter. Document images are electronically captured by the color scanner 10 and three color signals 26, 28, and 30 which correspond to red, green, and blue colors respectively for each pixel (super pixel 18). These analog color signals are digitized using A/D converters 32, 34 and 36 one for each corresponding color channel. The digital color signals are each fed to respective multipliers 38, 40, and 42. Each multiplier generates a "normalized" color signal by multiplying the incoming digitized color signal by a pre-determined gain coefficient. These gain coefficients are calculated by the microprocessor and RAM storage subsystem 52 during the form calibration process which will be discussed below. The normalized color signals (8 bits each) are then fed to summing circuit 44 which adds the three color signals to create a gray-scale black and white signal. This gray-scale signal is converted to a binary signal by threshold circuit 54 (1=black, 0=white). Threshold circuit 54 could be as simple as a comparator or as complicated as a full m×n 2-dimensional image processor using adaptive thresholding. The output of threshold circuit 54 contains binary video data that can be sent to an OCR algorithm for conversion.

The three color multipliers 38, 40 and 42 multiply their respective color signal by a predetermined gain coefficient and it is these coefficients that are the key to producing a drop-out color. Manipulation of these coefficients can recreate the effects of a normal color optical filter in conjunction with a normal black and white scanner. For example, a normal red optical filter causes attenuation of all wavelengths of light outside of the red pass band, thereby causing the scanner to be "blind" to red (because red will always have a greater amplitude than all other wavelengths, a black and white scanner would view red information as appearing to be white). Thus, it can be seen that by selecting small gain coefficients for green and blue and a large gain coefficient for red, the same "blindness" to the color red can be created. Accordingly, by adjusting coefficients, the electronic filter has the advantage of being adjusted or programmed for any color.

WHITE CALIBRATION

White calibration can be used to optimize scanner performance by compensating for any spectral anomalies or sensitivity variations on a pixel by pixel basis. The white calibration method discussed here is the preferred method for assuring uniform response from the scanner, since the compensation can be done just prior to running, thereby also compensating for differences due to age or wear.

Figure 3A:
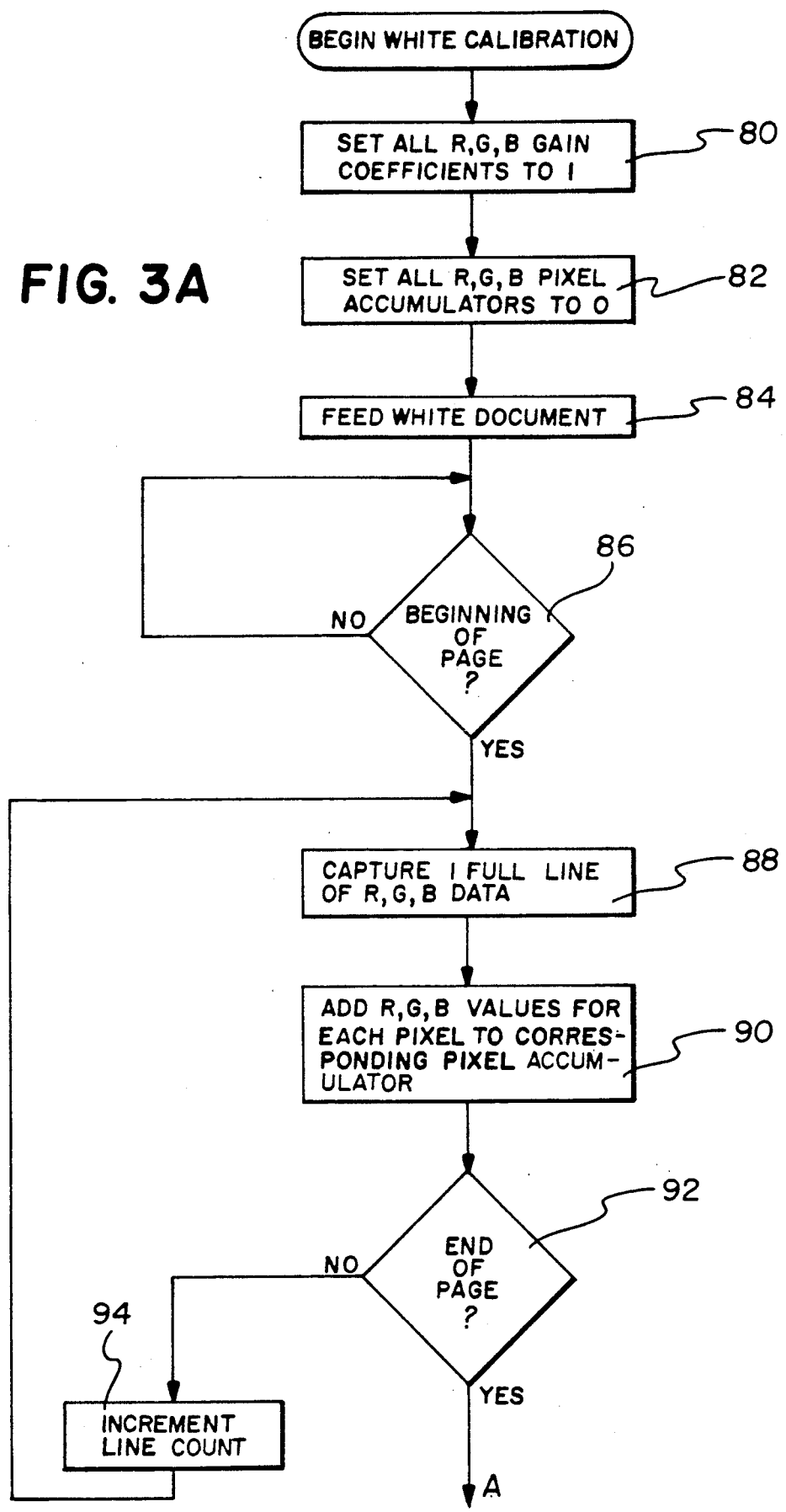
FIGS. 3A-B illustrate a flow chart that is used in conjunction with white calibration.
Figure 3B:
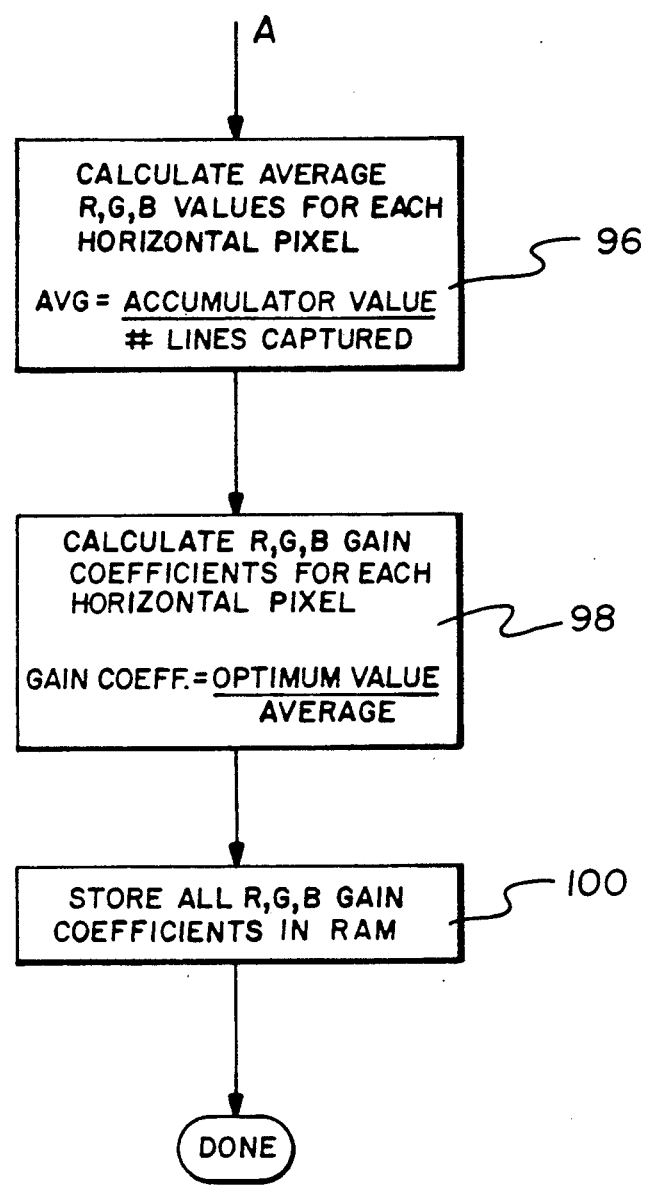

Feeding a white (blank) sheet of paper through the color scanner, exercises all three color signals simultaneously. Because a white sheet of paper has a known and predictable spectral curve, the color gain coefficients can be programmed in such a manner as to allow the scanner to mimic this ideal response. FIGS. 3A and B show a flow chart for implementing white calibration. Step 80 requires microprocessor and RAM storage subsystem 52 (FIG. 2) to set all of the red, green, and blue gain coefficients to a value of 1 and then in step 82 set all of the pixel accumulators (located in memory within microprocessor and RAM storage subsystem 52) to 0. In step 84, an operator feeds a white piece of paper through the color scanner in order to calibrate the response. In step 86 the beginning of the page is detected and the calibration process begins. Color scanner 10 outputs a sequential three color data stream (R,G,B) as it scans each horizontal line of the white document. This information is digitized by A/D converters 32, 34 and 36, one for each color channel. The digitized signals are sent to multipliers 38, 40 and 42 respectively. Because microprocessor 52 had previously set all gains to a value of 1, the output of each multiplier is equivalent to R,G,B values of each pixel. Microprocessor 52 captures this sequential line of grey scale color information in step 88 within its own memory (RAM) and then adds each pixel's red, green, and blue values to the appropriate accumulator in accordance with step 90.

The microprocessor maintains separate accumulators for R,G, and B values for each pixel (total number of accumulators $=3\times$ number of horizontal pixels). This accumulation process continues until the end of the page is detected in step 92. The total number of lines processed is maintained by a line counter in step 94. Once the scanning of the page has been completed, microprocessor 52 calculates the average red, green, and blue values for each pixel in step 96 by dividing each accumulator value by the line count (number of lines captured). This information corresponds to the average color response for each horizontal pixel.

Once this color response is known, red, green, and blue gain coefficients can be calculated for each pixel in step 98. This is done in order to "normalize" the response, which guarantees that each pixel responds in a similar fashion given a similar input. The gain coefficients are calculated by dividing the average R, G, B response of each pixel into the ideal or optimum R, G, B response. The optimum response is based on the ideal R, G, B values for a "white" input. Once the gain coefficients are calculated, 3 per pixel, and are stored in accordance with step 100 in a dual-ported memory (not shown, but part of the microprocessor and RAM storage subsystem), with microprocessor and RAM storage subsystem 52, thereby completing the white calibration process. Once calibrated, the apparatus (FIG. 2) is capable of compensating for any color or gain anomalies by multiplying each pixel's red, green, and blue video value by an image compensating coefficient. During operation, color scanner 10 outputs red, green, and blue signals for each horizontal pixel sequentially, and each color signal is digitized by A/D converters 32, 34 and 36. The digital grey scale color information for each pixel is then sent to multiplier circuits 38, 40 and 42 respectively. Microprocessor and RAM storage subsystem 52 recalls the unique R,G,B gain coefficients for each pixel in the horizontal scan and simultaneously presents these coefficients to the 3 multipliers, thereby multiplying each pixel's red, green and blue values by their corresponding gain coefficient. The outputs of these multipliers represent the normalized red, green, and blue values for each pixel. By running calibration, storing the unique color gain coefficients for each pixel, and subsequently using the gain coefficients to normalize the R,G,B response for each pixel, the output of color scanner 10 is balanced for a correct and uniform spectral response.

Figure 4A:
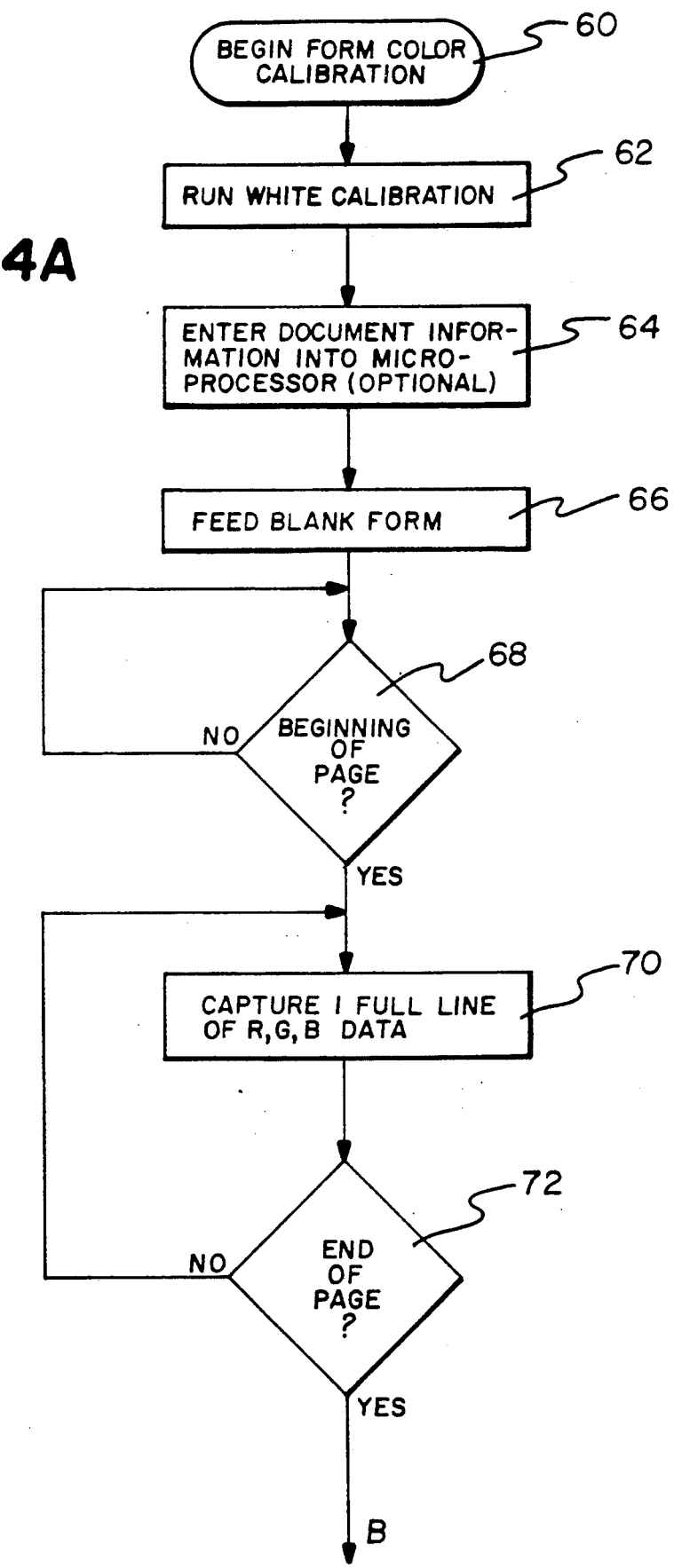
FIGS. 4A-B illustrate a flow chart that is used in conjunction with form color calibration.
Figure 4B:
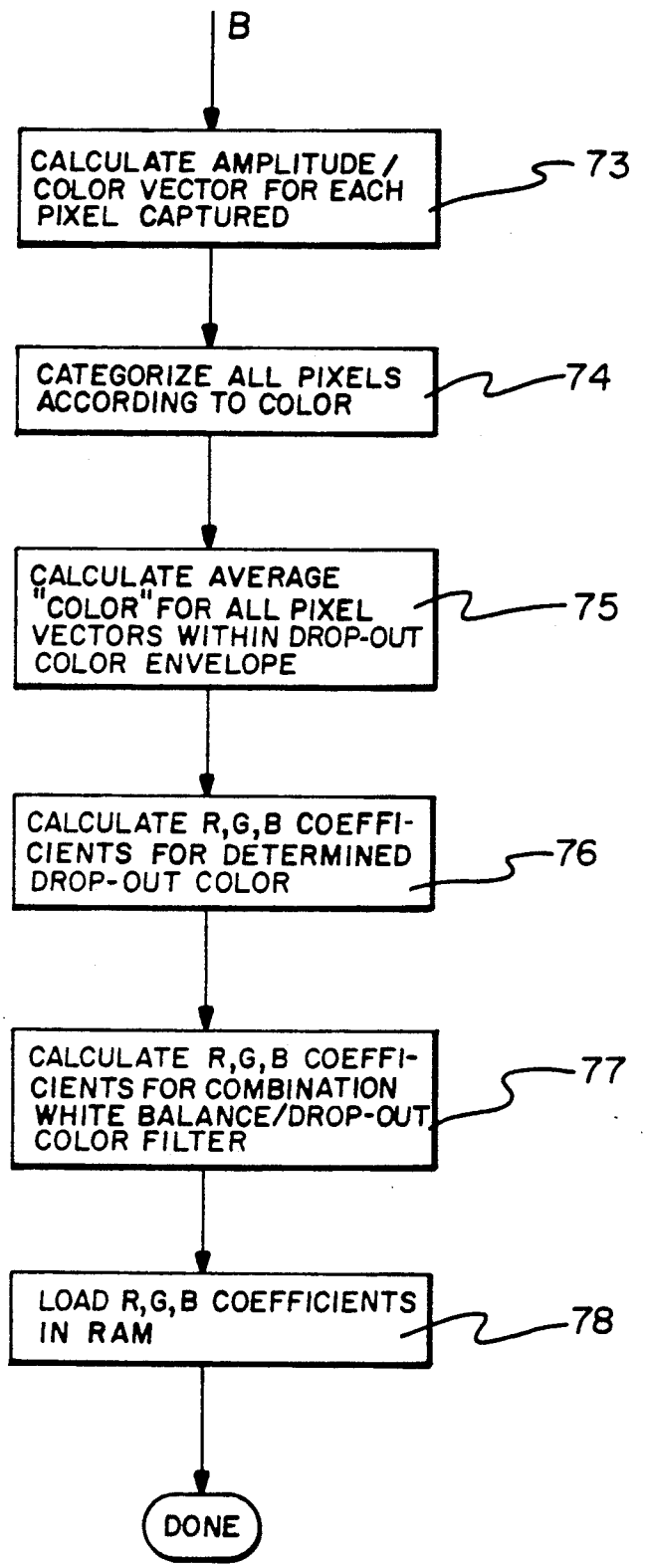

The apparatus can be programmed for any drop-out color automatically by running form color calibration step 60 shown in FIGS. 4A and 4B. As indicated in the flow chart in FIG. 4A, it is shown that step 62 "white" calibration takes place first because "white" calibration generates R, G, B coefficients to compensate for any non-uniformities. In the next step 64, the form color calibration program provides for the operator entry of specific form information. Such information could include information concerning form background color (usually white), intended drop-out color (general description such as red, violet, green, etc.) number of different colors used on the form (ex black text, red boxed, green logo, etc.), or the specific coordinates X, Y, height, width) for the OCR readable area on the form. This type of form information can aid the microprocessor in categorizing the captured data.

After the machine has been set up for calibration, step 66 provides that the operator feed a blank form using the same type of form to be run in the upcoming batch. In step 68, the apparatus waits for the leading edge of the document to be sensed and begins the capture of grey scale red, green and blue data in step 70 on a line by line basis. This process of data capture continues until the end of the page is detected in step 72.

Once all of the grey scale red, green, blue data has been captured, the microprocessor calculates an amplitude/color vector in step 73 for each pixel captured. The magnitude or "amplitude" (A) for each pixel is calculated by summing the red, green, blue values for that pixel. The "color" portion of the vector is calculated in 3-dimensional color space much like a "direction" is calculated in physical x-y-z space. The three color coordinates are normalized such that adding the three coordinate values (CR+CB+CG) results in a magnitude of 1. In order to accomplish this, the R,G,B values for each pixel must be multiplied by a normalizing factor (F) to create the color coordinates (Cr,Cg,Cb) where:

$$F = \frac{1}{R + G + B}$$

$$Cr = F \times R$$
$$Cb = F \times B$$
$$Cg = F \times G$$
and
$$A = R + G + B$$

The microprocessor stores the amplitude (A) and color (Cr,Cg,Cb) information for each pixel in RAM or other storage means, such as a hard disk.

After the amplitude and color have been calculated for all captured pixels, the next step 74 requires that the microprocessor "categorize" the color information. The particular algorithm used for categorization can vary by application. The general intent is to sort the colors captured (pixel by pixel) into predetermined color "bins". Microprocessor 52 would use the information entered prior to calibration to determine how many bins to use and what colors they should be. For example, a typical form used for OCR reading may use red printing on a white background. For this type of form, the microprocessor would set up "bins" for white and red. When categorizing the pixels all white pixels (Cr=Cg=Cb within a certain tolerance) would be grouped into the white bin and all red pixels (Cr>>Cg and $Cr >> Cb$ within a certain tolerance) would be grouped into the red bin.

After categorizing the pixels, the microprocessor moves to step 75 where it calculates the "average color" vector for all pixels within the drop-out color envelope (bin). This vector is calculated by averaging all red, green, and blue components within the red envelope, thereby creating a normalized vector (average red, average green, average blue) representing the drop-out color in step 76 ($D_R, D_G, D_B$). In the example using a form with red printing on a white background, the average color would be calculated for all of the pixels sorted into the "red bin", because red was identified as the drop-out color. This average vector then would be used in calculating the required R,G,B coefficients to produce an electronic red drop-out filter in accordance with step 77. In step 78, the final step, the R,G,B coefficients are loaded into random access memory (RAM).

The following relationships are used in calculating the drop-out coefficients:

$$(C_R)(D_R) + (C_G)(D_G) + (C_B)(D_B) = 1 \quad (1)$$

and $$C_R + C_G + C_B = 1 \quad (2)$$

where
$D_R$ = normalized red video level for the particular drop-out color ($0 < D_R < 1$)
$D_G$ = normalized green video level for the particular drop-out color ($0 < D_G < 1$)
$D_B$ = the normalized blue video level for the particular drop-out color ($0 < D_B < 1$)
$C_R$ = the calculated red coefficient for the particular drop-out color ($0 < C_R < 1$)
$C_G$ = the calculated green coefficient for the particular drop-out color ($0 < C_G < 1$)
$C_B$ = the calculated blue coefficient for the particular drop-out color ($0 < C_B < 1$)

Equation (1) guarantees that a particular color will drop-out by setting the total video output (red+green+blue) to the maximum value of 1. Equation (2), coupled with a range of 0-1 for each coefficient, guarantees that no input color (including a perfect "white", where red=green=blue=1) will cause the output to exceed a value of 1.

The normalized color vectors ($D_R$, $D_G$, $D_B$) are calculated as follows:

$$D_R = R/\text{SQRT}(R^2 + G^2 + B^2)$$

$$D_B = B/\text{SQRT}(R^2 + G^2 + B^2)$$

$$D_G = G/\text{SQRT}(R^2 + G^2 + B^2)$$

where:
R = measured Red response of calibration zone ($0 < R < 1$)
G = measured Green response of calibration zone ($0 < G < 1$)
B = measured Blue response of calibration zone ($0 < B < 1$)

In order to satisfy equations (1) and (2), and maximize the differential between filled-out text and the drop-out color, the coefficients $C_R$, $C_G$, and $C_B$ are calculated as follows:

$$C_R = D_R/(D_R + D_G + D_B)$$

$$C_G = D_G/(D_R + D_G + D_B)$$

$$C_B = D_B/(D_R + D_G + D_B)$$

Once calculated, these coefficient implement a bandpass filter with characteristics quite similar to that of an optical filter. The advantage of the above described filter is the capability of being able to program the exact color to be filtered.

Once again, using the example of the form with red printing on a white background, evaluation of the average red color can produce a nominal drop-out color with values R=0.9, G=0.3 and B=0.1. The corresponding normalized drop-out color vector would be:

$$D_R = 0.9/\text{SQRT}(0.9^2 + 0.3^2 + 0.1^2) = 0.94$$

$$D_G = 0.3/\text{SQRT}(0.9^2 + 0.3^2 + 0.1^2) = 0.31$$

and $$D_B = 0.1/\text{SQRT}(0.9^2 + 0.3^2 + 0.1^2) = 0.10$$

For this normalized drop-out color the 3 color coefficients would be calculated as follows:

$$C_R = 0.94/(0.94 + 0.31 + 0.10) = 0.70$$

$$C_G = 0.31/(0.94 + 0.31 + 0.10) = 0.23$$

$$C_B = 0.10/(0.94 + 0.31 + 0.10) = 0.07$$

After calculating the color coefficients for the particular drop-out color, the microprocessor must calculate new R,G,B coefficients in order to carry out both white balance and drop-out color with one set of coefficients (77) in FIG. 4B. These final coefficients (red coefficient, green coefficient, and blue coefficient) are calculated by multiplying the White Calibration coefficients by the drop-out color coefficients:

$$\text{Red Coefficient} = B_R \times C_R$$

$$\text{Green Coefficient} = B_G \times C_G$$

$$\text{Blue Coefficient} = B_B \times C_B$$

where:
$B_R$ = Red coefficient resulting from White Calibration
$B_G$ = Green coefficient resulting from White Calibration
$B_B$ = Blue coefficient resulting from White Calibration While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

ADVANTAGES AND INDUSTRIAL APPLICABILITY

The present invention is useful for processing business forms in conjunction with optical character recognition systems as a way of separating text information on forms by automatically detecting and selecting a drop-out color for OCR reading of those forms using a three color electronic scanner and electronic filtering technique. The invention is advantageous in eliminating the drop-out color variability problem associated with mechanical filter insertion. This variability can be caused by the color of the ink used on the forms varying from one printing batch to another such that the mechanical filter was ineffective in removing the printed text on the forms printed with the out of tolerance ink.

By using the electronic filter technique of the present invention, the electronic filter parameters are automatically adjusted based on the form currently being processed. Such a system is able to match any color that may be used on any business form.

Also, this invention allows for a convenient means for changing the color filter between batches. Instead of changing a mechanical filter, the filter can be changed electronically bY downloading new color gain coefficients (they could have been stored from a previous color calibration) or by running color calibration on the new color form.

Adding additional colored forms also is made easy. Rather than buy and install a new mechanical filter for the new form (and hope the color matches), one simply runs color calibration on the new form.

What is claimed is:

1. An apparatus for reading the image information of a colored original, comprising:
    means for scanning a colored original and outputting at least two separate color analog signals for each scan line;
    means for converting said analog signals into color digital video signals on a pixel by pixel basis;
    means for storing at least a portion of a scan line of color digital video signals for each color;
    means for analyzing each of said stored scan lines in order to classify the color of each pixel based on the color components of the corresponding color signals in each pixel;
    means for compensating each pixel within a scan line for amplitude and color response by varying coefficients associated with each color component;
    means for determining an average color value for a group of said classified pixels; and
    means for calculating color coefficients for said compensating means so as to implement an electronic filter to filter out said average color.

2. An apparatus as set forth in claim 1 wherein the compensating means takes the form of a digital multiplier.

3. An apparatus for processing a plurality of color video signals generated by a color scanner after said signals have been converted to a grey-scale digital format by an analog to digital converter associated with each color video signal on a pixel by pixel basis, wherein each pixel is comprised of a plurality of color components, said apparatus comprising:
    means for processing color signals to classify the color component of each pixel;
    means for determining an average color value for each group of classified pixels; and
    means for calculating color coefficients for each color signal so that an electronic filter is created to filter said average color.

4. An apparatus as set forth in claim 3 wherein the calculating of color coefficients further comprises:
    multiplication means for multiplying each color video signal by the corresponding color coefficient for each pixel in said scan line; and
    means for summing and averaging the results of said multiplications on a pixel by pixel basis of said respective signals, the output of which constitutes the equivalent of the insertion of a color filter.

5. An apparatus as set forth in claim 4 which further includes means for thresholding average pixel values to generate a 1 bit per pixel sequential scan line suitable for OCR reading.

6. An apparatus as set forth in claim 4 wherein multiplication means takes the form of a digital multiplier for each color video signal.

7. A method of processing a color form, said method comprising the steps of:
    scanning the color form and producing at least two grey-scale color outputs having segmented pixels for each color component;
    converting each output to a grey-scale digital format on a pixel by pixel basis;
    storing at least a portion of a scan line of each color grey-scale component;
    analyzing each of said stored scan line portions in order to classify the color of each pixel based on the color components of the color signals in each pixel;
    determining an average color valve for a group of said classified pixels; and
    calculating color coefficients to implement an electronic filter to filter out said average color.

* * * * *